United States Patent

[11] 3,560,820

| [72] | Inventor | Lewis E. Unnewehr<br>Birmingham, Mich. |
|---|---|---|
| [21] | Appl. No. | 795,793 |
| [22] | Filed | Feb. 3, 1969 |
| [45] | Patented | Feb. 2, 1971 |
| [73] | Assignee | Ford Motor Company<br>Dearborn, Mich.<br>a corporation of Delaware |

[54] RELUCTANCE MOTOR POWER CIRCUIT CONTAINING SERIES CAPACITANCE
9 Claims, 5 Drawing Figs.

[52] U.S. Cl. ................................................ 318/138,
318/139, 321/45, 310/163
[51] Int. Cl. .................................................. H02k 29/02
[50] Field of Search ......................................... 321/45C,
43, (Inquired); 318/138, 254, 139; 310/163

[56] References Cited
UNITED STATES PATENTS

| 3,207,974 | 9/1965 | McMurray | 321/45(C) |
| 3,308,371 | 3/1967 | Studtmann | 321/45(C) |
| 3,353,085 | 11/1967 | Morgan | 321/43 |
| 3,360,712 | 12/1967 | Morgan | 321/43 |
| 3,466,519 | 9/1969 | Platnick | 318/138 |

*Primary Examiner*—G. R. Simmons
*Attorneys*—John R. Faulkner and Glenn S. Arendsen

ABSTRACT: A commutating capacitor is coupled in series with a DC battery and the winding of a reluctance-type motor. In series with the capacitor is a circuit consisting of an SCR in parallel with a reverse biased diode or a second SCR. An SCR is coupled in parallel with the winding to freewheel winding current. Another SCR in series with an inductor can be coupled in parallel with the capacitor to reverse the capacitor charge.

INVENTOR
LEWIS E. UNNEWEHR

BY John R. Faulkner
Glenn S. Arendsen
ATTORNEYS

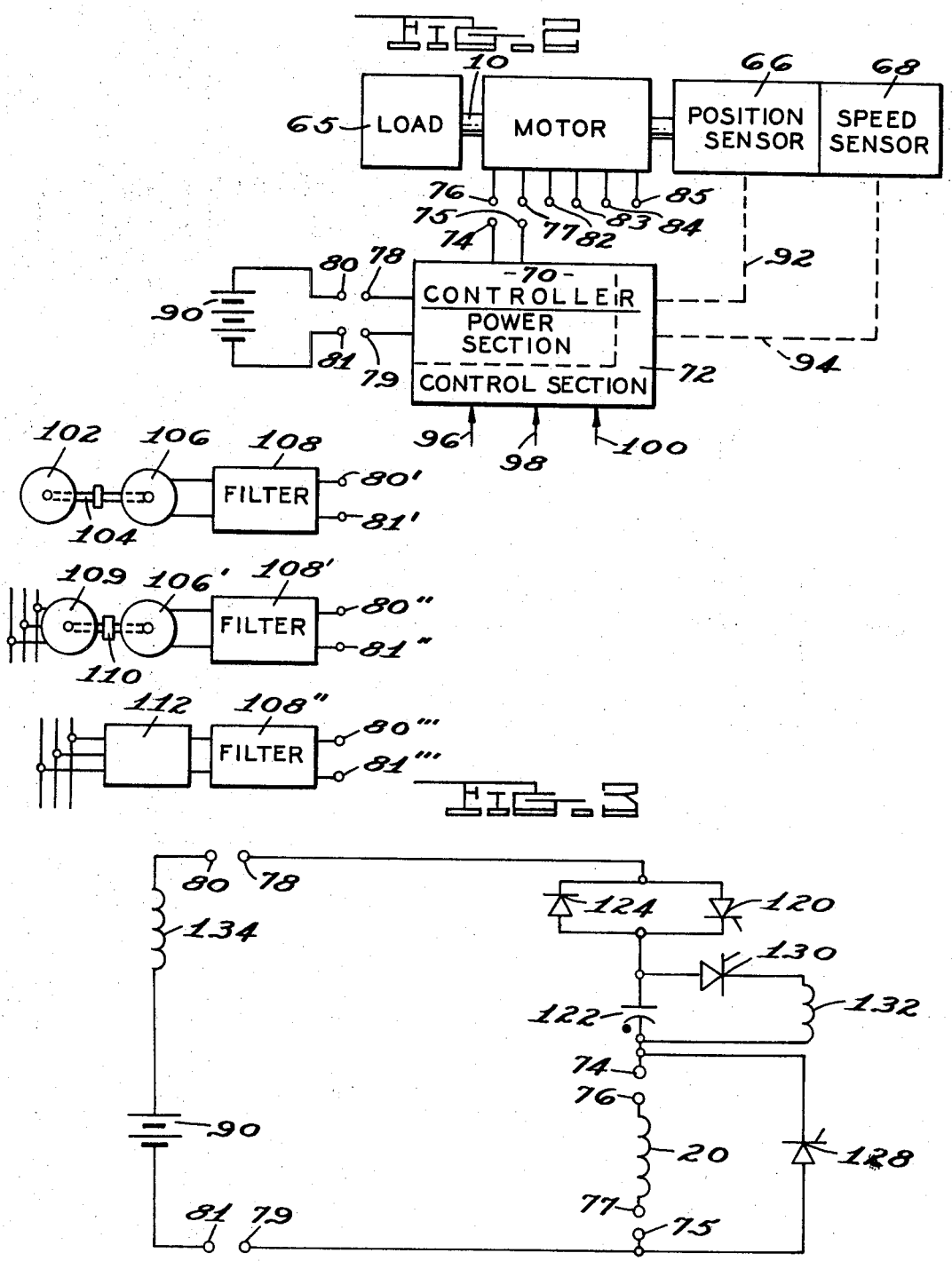

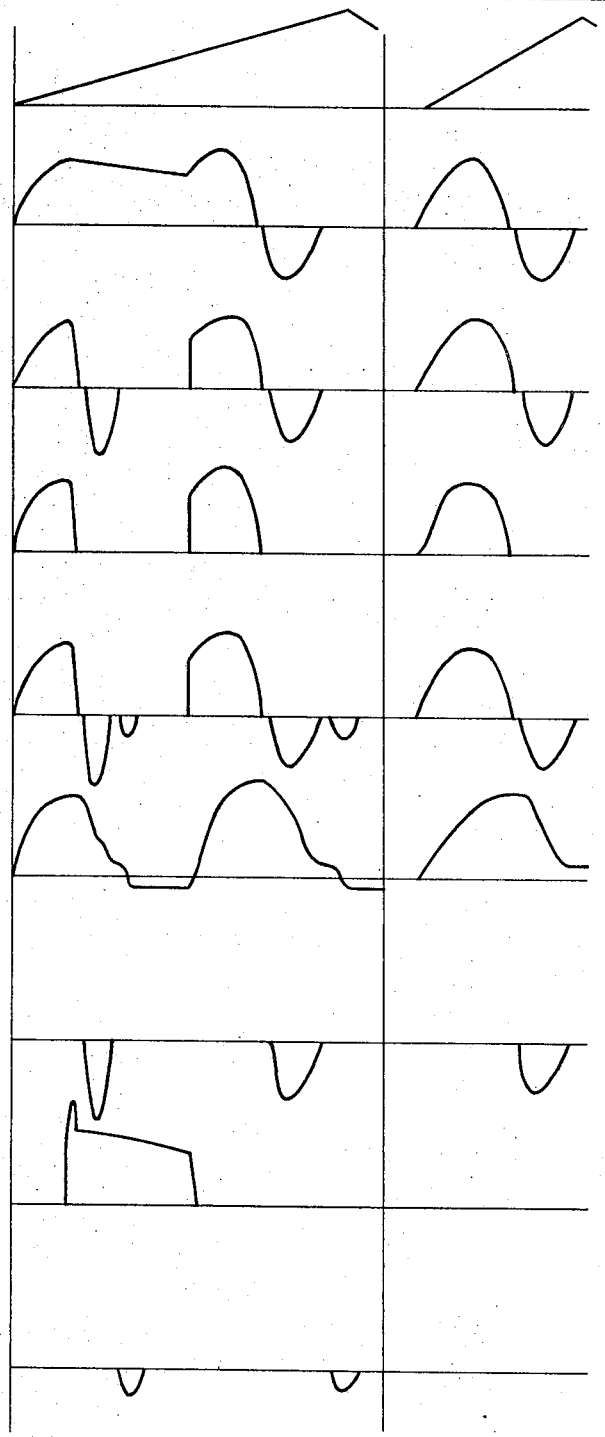

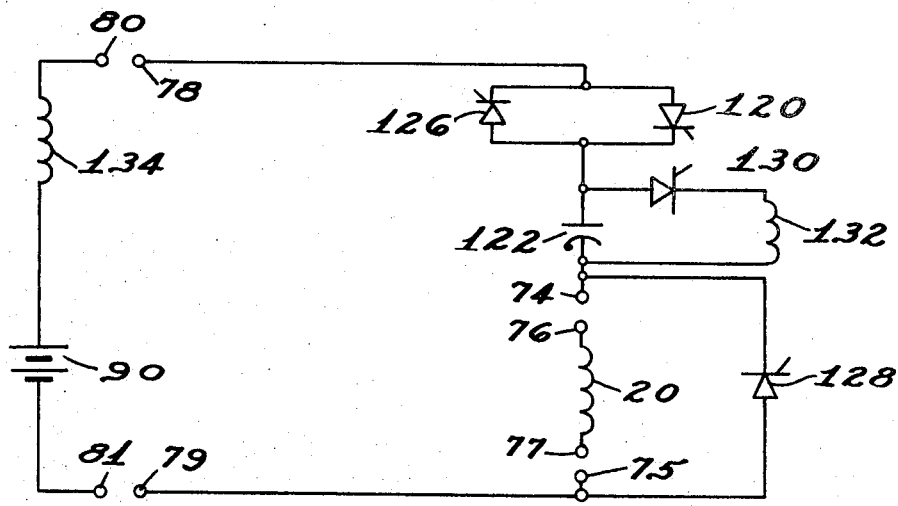

3,560,820

RELUCTANCE MOTOR POWER CIRCUIT CONTAINING SERIES CAPACITANCE

SUMMARY OF THE INVENTION

Brushless electric motors are being used in a variety of application where a high torque is required at low speeds and where the motors must be capable of operating at relatively high speeds exceeding 6,000 r.p.m. In many applications, such motors must operate efficiently from a DC source of electrical energy such as a storage battery. Previous circuits used to couple the motor windings to DC power sources contained large numbers of semiconductors to approach the preferred waveforms and wasted considerable amounts of electrical energy at the end of the motoring cycle.

The power circuit of this invention uses a minimum number of components to couple a DC electrical energy source to a variable reluctance-type motor in a manner optimizing electrical efficiency with component cost. Winding current is shaped at low speeds to approach a desired waveform by freewheeling the current. Maximum motor speed is limited automatically, and electrical energy remaining in the motor winding at the end of a motoring cycle is returned to the energy source. Since winding current in either direction produces motor torque, current returning to the battery can flow through the winding to generate additional torque. The circuit also provides a measure of voltage control and flows commutating capacitor current through the motor winding for high overall efficiency.

In the power circuit, a main solid-state switching device has its power terminals in series with the motor winding. A rectifier is coupled in parallel with the main switching device power terminals, with the anode of the rectifier connected to the cathode of the main switching device. Thus the rectifier is reverse biased by the batteries. A commutating capacitor is coupled in series with the motor winding and a freewheeling solid-state switching device is coupled in parallel with the motor winding. The rectifier can be replaced by a solid-state controlled switching device to achieve maximum motor speed, power capacity and voltage control, and a circuit for reversing the charge across the capacitor can be included if desired.

A process for operating the circuit efficiently comprises charging the capacitor to a valve greater than battery voltage to produce a current in the winding and then discharging the capacitor through the battery and winding. Winding current can be freewheeled to achieve a highly desireable waveform. Maximum motor speed is achieved by charging the capacitor during one period of changing winding reluctance and discharging the capacitor during a succeeding period of changing winding reluctance.

A disc-type variable reluctance motor is preferably used with the power circuit of this invention. Smooth torque generation is provided by using multiple phases, preferably three or more. Each phase comprises a toroidal winding that surrounds a stationary stator disc having pie-shaped sections of laminated steel spaced by minimum permeance sections usually made of aluminum or reinforced polymeric materials. A rotor disc of similar construction is mounted on each side of the stator disc. The periphery of each rotor is wound with a thin layer of a high strength, low permeance material such as fiberglass to increase the maximum potential rotor speed.

The power circuit of this invention is useful particularly in an electrically powered vehicle where the disc-type motor is connected to a vehicle wheel. High torque is generated at low speeds by the idealized wave shape produced by the power circuit, and the current returned to the vehicle battery improves significantly the overall efficiency. Moreover, vehicle braking can be provided and at least part of the energy generated during vehicle braking returned to the battery without additional power circuit components.

A position sensor and a speed sensor are connected to the motor shaft and coupled to the control section of a controller that contains the power circuit. The speed sensor is not essential to motor operation since signals from the position sensor are sufficient to determine the triggering points of the switching devices. signals from the speed sensor are useful, however. in advancing the triggering points at higher motor speeds to absorb switching delays of the switching devices. A torque level input, forward or reverse input, and a system protection input also are coupled to the control section which combines the inputs to produce the desired switching sequence of the switching devices in the power circuit. System protection inputs include devices for shutting off all circuits to a motor in case the load on the motor disappears suddenly, such as when a vehicle wheel begins spinning on ice. The torque level input and the forward or reverse inputs are of course controlled by the driver or operator.

In nonvehicle applications, other sources of the DC electrical energy can be used in place of a storage battery. For example, the power input to the power circuit can be provided by a DC generator driven mechanically from any prime mover such as a reciprocating engine or a gas turbine engine to produce an electrical transmission system, three-phase industrial power can be used to operate an induction machine mechanically coupled to a DC generator, or the three-phase industrial power can be coupled through an electronic rectifier and converter.

BRIEF DESCRIPTION OF THE DRAWINGS

FIG. 2 is a schematic of the overall system showing the relationship of the controller and the energy sources to the motor. Alternative DC energy sources also are shown in the FIG. FIG. 3 is a schematic of a power circuit of this invention for one phase of the motor. Similar power circuits are provided for the other phases. FIG. 4 shows the waveforms of the current and voltage in the major components of the FIG. 3 power circuit during complete low-speed and high-speed motoring cycles. FIG. 5 is a schematic of a power circuit of this invention that significantly increases maximum motor speed.

DETAILED DESCRIPTION

Figure 1:
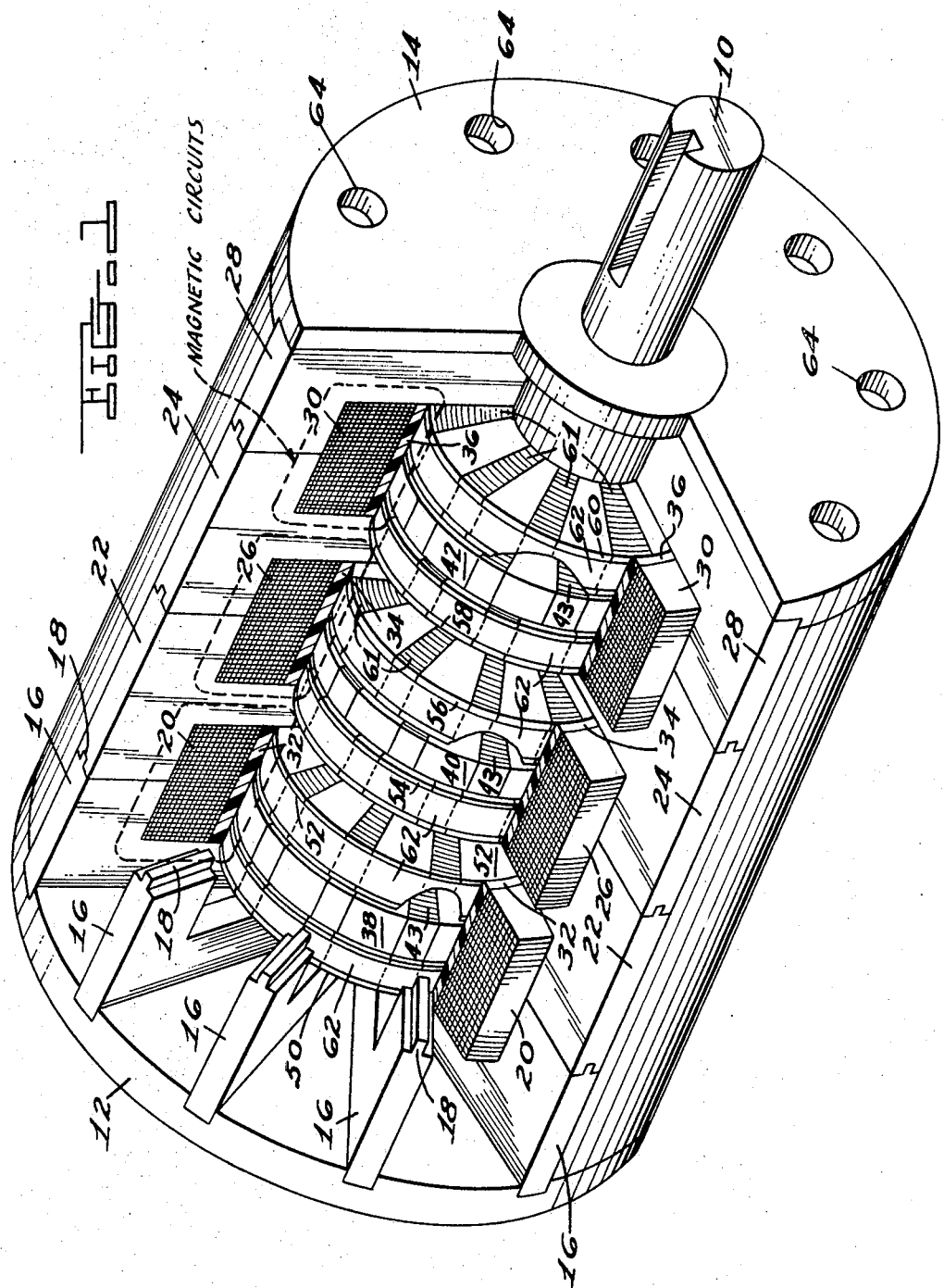
FIG. 1 is a sectioned perspective showing the construction of a three-phase disc-type reluctance motor capable of using the power circuit of this invention to great advantage.

Referring to the motor construction of FIG. 1, a motor shaft 10 is mounted rotatably in two end plates 12 and 14. A plurality of L-shaped members 16 have their longer legs positioned in shallow grooves on the inner face of end plate 12. The shorter legs of member 16 project axially inward with the outer surfaces thereof at the approximate level of the outer periphery of end plate 12. Members 16 are made of laminated steel with the limitations running parallel to the shaft axis and have small radially directed tongues 18 at the inner surfaces of the shorter legs.

A toroidal winding 20 has one-half of its width fitting into the steps of L-shaped members 16 and is held in place by a plurality of T-shaped members 22. Some of the members have been removed to show the internal structure of the motor. Members 22 have a groove cooperating with tongue 18. Similar T-shaped members 24 hold the winding 26 of the second phase in place against members 22 and L-shaped members 28 cooperate with T-shaped members 24 to hold the winding 30 of the third phase in place. Members 22, 24 and 28 also are made of laminated steel.

Rims 32, 34 and 36 of fiberglass are positioned against the radially interior surfaces of respective windings 20, 26 and 30 and are connected to the outer peripheries of respective stator discs 38, 40 and 42. Each stator disc comprises a plurality of pie-shaped laminated steel sections 43 separated by a material having a low magnetic permeance such as aluminum or a reinforced phenolic resin. The number of sections 43 in each stator disc corresponds to the number of L-shaped members 16 and the sections in each stator disc are aligned with members 16.

Rotor discs 50 and 52 are fastened to shaft 10 and positioned on each side of stator disc 38 to complete the first phase of the motor. Similarly, rotor discs 54 and 56 are positioned on each side of stator disc 40 and rotor discs 58 and 60 are positioned on each side of stator disc 42 to complete the second and third phase respectively. Each rotor disc also has a pie-shaped section 61 of laminated steel surrounded by a section of a low permeance material. In a three-phase motor the laminated sections of both the stator discs and the rotor discs have a peripheral width approximately corresponding to the width of members 16 and usually are surrounded on each side by twice this width of the lower permeance material. The width of the lower permeance material can vary from one to two times the width of the laminated sections if desired.

A narrow groove is cut into the periphery of each rotor disc and this groove is filled with a high strength layer of fiberglass 62. Laminated section 61 of the rotor discs in each phase are aligned with each other. Additionally, laminated sections of the rotor discs in the second phase are spaced peripherally by the width of a section from the laminated sections of the discs in the first phase and the laminated sections of the rotor discs in the third phase are spaced in the same direction by the width of a laminated section from the corresponding sections of the discs in the second phase. Thus, when sections 61 of rotor discs 50 and 52 are aligned with sections 43 of stator disc 38, sections 61 of discs 54 and 56 are aligned with imaginary sections of stator disc 40 adjacent its laminated sections, and sections 61 of discs 58 and 60 are aligned with imaginary sections of stator disc 42 adjacent its laminated sections but located on the sides opposite the imaginary sections of disc 40. Long bolts pass through appropriate holes 64 in end plates 12 and 14 to clamp the parts of the motor together.

As shown in FIG. 2, the motor of FIG. 1 has its shaft 10 connected to a load 65 on one side and a position sensor 66 and speed sensor 68 on the other side. In an electrically powered automobile, a vehicle driving wheel constitutes load 65. A controller made up of a power section 70 and a control section 72 has its output terminals 74 and 75 connected to terminals 76 and 77 respectively of the first phase winding 20. Input terminals 78 and 79 of power section 70 are connected to the respective positive and negative terminals 80 and 81 of a DC battery 90. Two similar controllers (not shown) have their output terminals connected respectively to the terminals 82 and 83 of the second phase winding 26 and the terminals 84 and 85 of the third phase winding 30.

Signals generated by the position sensor (and the speed sensor if one is used) are fed into control section 72 as indicated by dashed lines 92 and 94. These signals are representative of the relative positions of laminated sections 43 of the rotor discs to the laminated sections of the stator discs for each phase, and are used to trigger the SCR's at the proper time. Signals representative of the desired torque input, a forward or reverse function, and a system protection input also are applied to control section 72 as represented by arrows 96, 98 and 100.

FIG. 2 also present schematically other sources of DC power suitable for connection to input terminals 78 and 79 of each controller. In the first alternate source, a gas turbine or internal combustion engine 102 is coupled mechanically by a shaft 104 to a DC generator 106. The output leads of generator 106 are coupled through a filter 108 to terminals 80' and 81'. This arrangement uses the motor and power circuit of this invention in an electrical transmission system suitable for large commercial or military vehicles.

For industrial applications having a readily available source of three-phase AC electrical power, a three phase motor 109 is connected electrically to the three-phase power line and is coupled mechanically by a shaft 110 to a DC generator 106'. The output leads of generator 106' are coupled through a filter 108' to terminals 80'' and 81''. Alternatively, an electronic rectifier and inverter 112 connects the three-phase AC system through a filter 108'' to terminals 80''' and 81'''.

Referring to FIG. 3, a silicon-controlled rectifier 120 that serves as the main solid-state switching device has its anode connected to terminal 78 and its cathode connected to the undotted plate of a capacitor 122. The anode and cathode of rectifier 120 of course constitute its power terminals. Connected in parallel with SCR 120 is either a diode 124 or another silicon-controlled rectifier 126. Diode 124 or SCR 126 is connected so it will be reversed biased by battery voltage; i.e., the anode of the diode or SCR is connected to the cathode of SCR 120 and the cathode of the diode or SCR is connected to the anode of SCR 120. The dotted plate of capacitor 122 is connected to terminal 74 (the plated are designated by dots for illustrative purposes only).

The cathode of a freewheeling silicon-controlled rectifier 128 is connected to terminal 74 and its anode is connected to terminal 75. Coupled in parallel with capacitor 122 is a charge reversing circuit that comprises a silicon-controlled rectifier 130 having its anode connected to the undotted plate of capacitor 122 and its cathode connected to an inductor 132. The other side of inductor 132 is coupled to the dotted plate of capacitor 122. The inductance 134 connected in series with battery 90 represents the residual inductance of battery 90 and the connecting circuitry.

At low motoring speeds, the FIG. 3 circuit operates in the following manner (See also FIG. 4). As the laminated sections 61 of rotor discs 50 and 52 begin to move into alignment with laminated sections 43 of stator disc 38, a pulse is applied to the gate of SCR 120 to switch the SCR into conduction. A positive charge begins building on the undotted plate of capacitor 122 and a current begins building in winding 20 to generate motor torque. The current builds at a rate determined by inductance 134, the inductance of winding 20 and the capacitance of capacitor 122.

At or shortly after the current reaches its peak and begins to decline, a pulse is applied to the gate of SCR 128. SCR 128 breaks into conduction and begins freewheeling the current through winding 20. The impedance of the parallel circuit of winding 20 and SCR 128 appears to be nearly zero to the external circuit, and capacitor 122 quickly completes its charging cycle. When the current through SCR 120 falls to zero, SCR 120 self-commutates. The positive charge on the undotted plate of capacitor 122 discharges through diode 124, inductance 134, battery 90 and SCR 128. The energy stored in capacitor 122 thus returns to battery 90 and the voltage across capacitor 122 returns almost to zero depending on the residual circuit resistance.

When the freewheeling current in winding 20 has decayed to a predetermined value, the current is reinforced by again triggering SCR 120. SCR 128 is commutated and capacitor 122 again charges beyond battery voltage to produce additional current in winding 20. Another freewheeling period can be induced by again triggering SCR 128. Greater current reinforcement can be obtained by reversing the residual charge to the dotted plate of capacitor 122 before triggering SCR 120.

As the laminated sections of rotors 50 and 52 approach complete alignment with the laminated sections of stator 38, winding current must be removed rapidly to prevent generating negative torque. This is accomplished by omitting the gate pulse on SCR 128 at the end of a reinforcing cycle. When capacitor 122 approaches its full voltage, SCR 120 self-commutates and the capacitor discharges through diode 124, inductance 134, battery 90 and winding 20. As the voltage across the capacitor approaches zero, diode 124 becomes reverse biased to prevent circuit resonance.

At high motor speeds, freewheeling and reinforcing are omitted. One cycle of current produced during capacitor charging and discharging flows in winding 20 as the laminated sections of rotors 50 and 52 rotate from beginning alignment with laminated sections 43 of stator 38 to full alignment therewith.

Substituting an SCR 126 for diode 124 as shown in FIG. 5 provides a significant increase in maximum motor speed. SCR 120 is triggered at the beginning of one period of increasing alignment. Capacitor 122 charges as alignment increases and, at maximum motor speed, completes charging as perfect alignment is achieved. Inductance 134 and the inductance of winding 20 charge the capacitor to a value greater than battery voltage; inductance 134 usually is sufficient to produce a voltage on capacitor 122 approximately double that of battery 90. The charge is held on capacitor 122 until the next period of increasing alignment begins, at which time SCR 126 is gated. Capacitor 122 discharges through SCR 126, inductance 134, battery 90 and winding 20 and the current in winding 20 produces motoring torque. Operation is continued by charging capacitor 122 at the beginning of the next period of increasing alignment. At low motor speeds, a pulse is applied to the gate of SCR 126 as capacitor 122 reaches its fully charged condition so circuit operation is essentially similar to the circuit containing diode 124.

SCR 126 also can be used to increase motor power. At the end of a capacitor charging cycle, SCR 126 is held off instead of being triggered to discharge capacitor 122 back into the battery. The capacitor charge is pumped to the dotted plate by triggering SCR 130. When SCR 120 is triggered at the beginning of the next cycle, the voltage applied to winding 20 equals the sum of the charge on capacitor 122 and the battery voltage. Motor output is increased by the greater amount of current in winding 20. Similar operation can be achieved by reversing the capacitor charge at the end of each cycle. Following this technique for several motor cycles produces a voltage across winding 20 approximately four to six times greater than battery voltage, with a consequently greater current pulse.

Motor braking is achieved by triggering SCR 120 as the laminated sections of the rotor are moving out of alignment with the laminated sections of the stator. Triggering SCR 120 so the magnetic flux generated by winding 20 draws the laminated sections of the rotor into alignment from the opposite direction produces reverse motoring.

Thus this invention provides a power circuit using a minimum number of components to coupled DC electrical energy to a variable reluctance motor winding. The power circuit freewheels motor current at low speeds to achieve a more efficient current waveform and permits a high motor speed by charging and discharging the series capacitor during alternating cycles.

I claim:

1. In a reluctance motor having a motor winding that has a varying inductance during motor operation, a power circuit for applying electrical power from a DC source of electrical energy having residual series inductance comprising:
   a main solid-state switching device having its anode and cathode terminals in series with said windings;
   a rectifying means in parallel with the anode and cathode terminals of said main switching device, the anode of said rectifying means being connected directly to the cathode of the main switching device and the cathode of said rectifying means being connected directly to the anode of the main switching device;
   a commutating capacitor in series with the anode and cathode terminals of the main solid-state switching device and said winding; and
   a freewheeling solid-state switching device in parallel with said motor winding.

2. The reluctance motor of claim 1 comprising reversing means for reversing a charge on said commutating capacitor.

3. The reluctance motor of claim 2 in which the reversing means comprises a reversing inductor in series with a solid-state switching device, said reversing inductor and switching device being in parallel with said commutating capacitor.

4. The reluctance motor of claim 3 in which the commutating capacitor is connected between the motor winding and the main switching device.

5. The reluctance motor of claim 4 in which the rectifying means is a solid-state switching device.

6. The reluctance motor of claim 5 in which the solid-state switching devices are thyristors.

7. The reluctance motor of claim 6 comprising a motor stator having spaced sectors of high magnetic permeance material, a motor rotor having sectors of high magnetic permeance material, and position sensing means for sensing the position of the rotor sectors of high permeance material relative to the stator sectors, said position sensing means generating signals that trigger said switching devices.

8. The reluctance motor of claim 1 in which the rectifying means is a thyristor.

9. The reluctance motor of claim 1 comprising a motor stator having spaced sectors of high magnetic permeance material, a motor rotor having sectors of high magnetic permeance material, and position sensing means for sensing the position of the rotor sectors of high permeance material relative to the stator sectors, said position sensing means generating signals that trigger said switching devices.